US008825550B2

(12) United States Patent
Marr et al.

(10) Patent No.: US 8,825,550 B2
(45) Date of Patent: Sep. 2, 2014

(54) SCALING A VIRTUAL MACHINE INSTANCE

(75) Inventors: Michael David Marr, Monroe, WA (US); Marcin P. Kowalski, Cape Town (ZA)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/593,226

(22) Filed: Aug. 23, 2012

(65) Prior Publication Data

US 2014/0058871 A1    Feb. 27, 2014

(51) Int. Cl.
*G06F 21/00* (2013.01)
(52) U.S. Cl.
USPC .......................................................... 705/52
(58) Field of Classification Search
USPC .............. 705/52, 16, 21, 59, 71; 380/44, 262, 380/278, 279
See application file for complete search history.

(56) References Cited

U.S. PATENT DOCUMENTS

| 2010/0241751 A1* | 9/2010 | Sonoda et al. ................. 709/226 |
| 2012/0221454 A1* | 8/2012 | Morgan .......................... 705/37 |
| 2013/0019243 A1* | 1/2013 | Schmidt et al. .................... 718/1 |
| 2013/0254768 A1* | 9/2013 | Wipfel et al. ..................... 718/1 |

* cited by examiner

*Primary Examiner* — Dante Ravetti
(74) *Attorney, Agent, or Firm* — Novak Druce Connolly Bove + Quigg LLP

(57) ABSTRACT

Techniques are described for scaling of computing resources. A scaling service is utilized that allocates additional computing resources (e.g., processors, memory, etc.) to a virtual machine instance (or other compute instance) and/or de-allocates computing resources from a virtual machine instance according requests and/or thresholds. In addition to the foregoing, other aspects are described in the description, figures, and claims.

3 Claims, 7 Drawing Sheets

SCALING A VIRTUAL MACHINE INSTANCE

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software needed.

In this context, many cloud computing providers utilize virtualization to allow multiple users to share the underlying hardware and/or software resources. Virtualization can allow computing servers, storage device or other resources to be partitioned into multiple isolated instances that are associated with (e.g., owned by) a particular user. A cloud computing provider usually assigns one or more virtual machines to each of its customers, and the virtual machines are used to execute the applications and/or other workload for those customers. A number of issues and inconveniences may occur, however, when the processing load of the customer begins to exceed the capacity of the virtual machines due to an increase in demand or other reasons.

BRIEF DESCRIPTION OF THE DRAWINGS

Various embodiments in accordance with the present disclosure will be described with reference to the drawings, in which.

DETAILED DESCRIPTION

Figure 1:
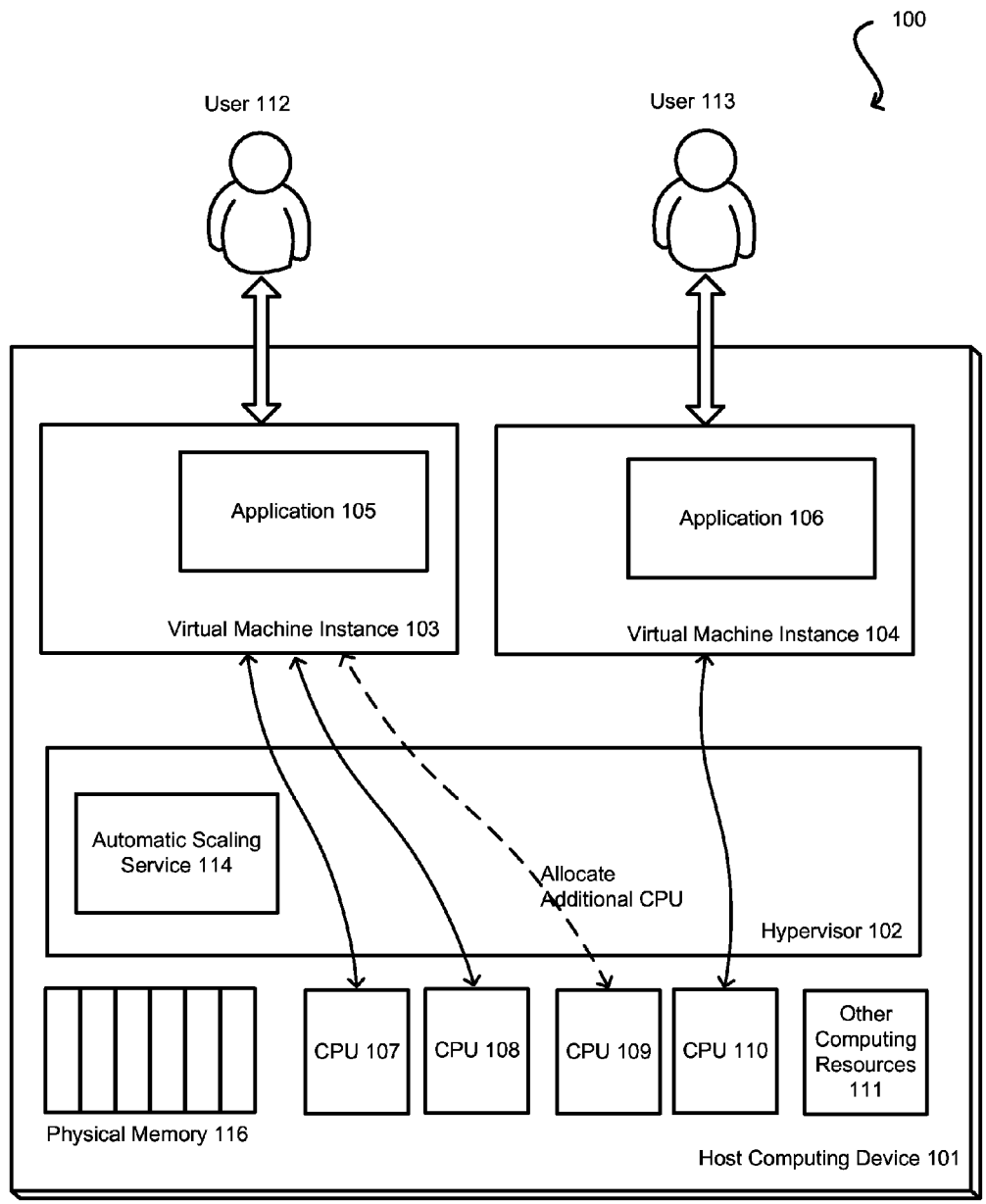
FIG. 1 illustrates an example of scaling up a virtual machine instance by allocating additional CPU, in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for scaling computing resources. In particular, various embodiments provide approaches for automatically allocating additional computing resources (e.g., processors, memory, networking devices etc.) to a virtual machine instance and/or de-allocating computing resources from a virtual machine instance according to various user-specified thresholds or user requests. Effectively, this enables a virtual machine instance to "grow" or "shrink" in size and capacity on-demand or according to the actual demand for the resources that the virtual machine provides.

In accordance with various embodiments, one such approach can be implemented by a service provider of a shared computing resource environment (e.g., a "cloud" computing provider) that hosts applications and virtual machine instances on behalf of its customers. The applications and virtual machine instances are hosted on the physical resources (e.g., host servers and other network resources) owned and operated by the service provider. In accordance with an embodiment, the service provider receives a virtual machine image from the customer and provisions one or more virtual machine instances for the customer based at least in part on the virtual machine image. These virtual machine instances can then execute the various applications and/or other services of the customer using the physical computing resources of the service provider.

In accordance with an embodiment, each virtual machine instance is provisioned on a host machine (e.g., computing device). Each host machine can host one or more virtual machine instances. In at least one embodiment, the host machine further includes a hypervisor and service hosting layer that provides access to the hardware device drivers of the host machine and enables the one or more virtual machine instances to access the devices directly or through a virtualization abstraction.

In accordance with an embodiment, once the virtual machine instance has been provisioned on the host machine, the service provider may receive from the customer (e.g., via an application programming interface (API)) a request to allocate additional resources to the virtual machine instance or to de-allocate resources from the instance. Furthermore, the API can allow the customer to specify one or more customer-defined thresholds for the virtual machine instance pertaining to various operating metrics of the underlying resources, such as CPU utilization. In addition, the customer is enabled to specify the various runtime operating metrics associated with their service or application that may be relevant to the decision to scale the virtual machine instance. These operating metrics and thresholds can allow the customer to indicate the conditions under which resources allocated to the virtual machine instance should be scaled up or down.

In accordance with an embodiment, a service on the service provider's system monitors operating metrics during execution of the virtual machine instance. In the same, or an alternative embodiment, the service may receive operating metrics from a guest agent executing within the virtual machine instance. Consequently, the operating metrics may be generated from the server and/or from within the virtual machine instance. In the instance that the service detects that one or more of the metrics have exceeded a threshold, such as a customer-defined threshold, for a predetermined period of time, it may initiate the scaling up or down of the virtual machine instance by adding or removing resources (e.g., central processing units (CPUs), memory, other hardware devices). For example, if the service detects that the virtual machine instance has been operating at more than 90% CPU capacity for at least 10 seconds over the last hour, it may allocate additional CPU capacity to the virtual machine instance (e.g., assign additional CPUs or CPU cores, switch to a more powerful CPU, etc.). As another example, if the service detects that the virtual machine instance has been operating at less than 10% CPU capacity for a specified period of time, it may de-allocate (e.g., reduce) some amount of CPU capacity from the virtual machine instance. In some embodiments, the scaling of the virtual machine instance can be performed automatically, without requiring any manual involvement on the part of the customer. In other embodiments, the scaling of the virtual machine instance can be performed in response to receiving a request to scale the instance from the user (e.g., owner of the virtual machine).

In accordance with an embodiment, the virtual machine instance can be automatically scaled up until a single virtual machine instance is no longer capable of adequately supporting the workload of the customer. Once this limit has been reached, the service may begin to automatically assign additional virtual machine instances to handle the workload. In addition, the service may continue to automatically scale each of the additional VM instances up or down to meet the fluctuating demand in the manner previously described. In some embodiments, operating metrics and user defined thresholds may, in part, include requirements for redundancy, availability, durability or the like, so "scale out" to multiple VM's hosted on different physical servers may occur even if there is sufficient resource capability on a single server to satisfy other resource requirements, such as a certain amount of CPU or RAM.

In accordance with various embodiments, the managing of scaling up (or down) VM instances within a host can be performed by using web-based graphical user interface (GUI), customer defined thresholds, or fully automatic inference in a closed measurement/action loop. This automatic scaling can enable several billing and/or payment models. For example, a customer may be charged for a generic scalable VM instance which charges per GHz hour (or other predetermined time period) and/or GB per hour of RAM, separating out individual machine resources (CPU, RAM, network) and charging differentially and the like.

In various embodiments, Web Services can be used to allow a user (e.g., customer) to request the scaling of virtual machine instances or to specify various thresholds that control when these VM instances will grow or shrink in resource capacity. Web Services can include both Query and simple object access protocol (SOAP) APIs. It should be noted, however, that Web Services are not limited to SOAP based API calls and can include any remote procedure/function/method execution carried out using a network, such as the Internet.

In various embodiments, a web service can be deployed by the service provider, which provides resizable computing capacity (e.g., additional server instances in a resource center). This computing capacity can be used to build and host the customer's software systems. The service provider can provide access to these resources using APIs or web tools and utilities. Users can thus access the API functionality exposed by the service provider, in order to add or remove resources, scale based on metrics, redundancy, availability, and the like.

FIG. 1 illustrates an example 100 of scaling up a virtual machine instance by allocating additional CPU, Virtual CPUs (VCPU), Physical CPUs (PCPU), cores of a physical CPU or fractions thereof and herein generally referred to as "CPU", in accordance with various embodiments. In the illustrated embodiment, a host computing device 101 includes a hypervisor 102 that manages virtual machine instances 103 and 104. A hypervisor 102 manages the execution of the one or more guest operating systems and allows multiple instances of different operating systems to share the underlying hardware resources. Conventionally, hypervisors are installed on server hardware, with the function of running guest operating systems, where the guest operating systems themselves act as servers. In various embodiments, there can be at least two types of hypervisor 102: a type 1 (bare metal) hypervisor; and a type 2 (hosted) hypervisor. A type 1 hypervisor runs directly on the hardware resources and manages and controls one or more guest operating systems, which run on top of the hypervisor. A type 2 hypervisor is executed within the operating system and hosts the one or more guest operating conceptually at a third level above the hardware resources. Either type of hypervisor can be implemented in accordance with the embodiments described herein. The hypervisor 102 can host a number of domains (e.g. virtual machines), such as the host domain (or service layer or virtualization layer or the like) and one or more guest domains. In one embodiment, the host domain (e.g., Dom-0) is the first domain created and helps manages all of the hardware devices and other domains running on the hypervisor 102. For example, the host domain can manage the creating, destroying, migrating, saving, or restoring the one or more guest domains (e.g., Dom-U). In accordance with various embodiments, the hypervisor 102 controls access to the hardware resources such as the CPU, input/output (I/O) memory and hypervisor memory. In the illustrated embodiment, the hypervisor 102 includes an automatic scaling service 114 that performs the scaling of the virtual machine instance by allocating or de-allocating resources to the virtual machine instance. Alternatively, the scaling service can reside in Dom-0 or externally with respect to the host computing device, and the host computing device may include a thin agent to execute commands received from the external scaling service.

In accordance with an embodiment, the hardware resources of the host computing device 101 include physical memory 116, one or more central processing units (CPUs) (107, 108, 109, 110) and any other hardware resources or devices 111. The physical memory 116 can include any data storage device, including but not limited to solid state drive (SSD), magnetic disk storage (HDD), random access memory (RAM) and the like. In various embodiments, other hardware resources 111 can include but are not limited to a network interface controller (NIC), a graphics processing unit (GPU), peripheral input/output (I/O) devices and the like.

In accordance with an embodiment, each virtual machine instance (103, 104) can be associated with at least one user 112, 113 (e.g., a customer of the service provider). Each virtual machine instance can execute at least one application (105, 106) or other service on behalf of the user. In accordance with the illustrated embodiment, the virtual machine instance 103 is assigned a set of one or more of CPUs (e.g., 107 and 108) and virtual machine instance 104 is assigned another set of CPUs (e.g., 110). In various embodiments the CPUs can be actual physical CPUs or alternatively, can be virtual CPU capacity that is assigned to the virtual machine.

In various embodiments, the users (112, 113) are allowed to specify one or more threshold values for the various operating metrics associated with their virtual machines. As illustrated in the figure, when the processing load on the application 105 executing on the virtual machine instance 103 exceeds such a predetermined threshold, the system can allocate additional CPU 109 to the virtual machine instance 103 to meet the increased demand. Similarly, when the processing load decreases, the system may reduce the CPU capacity assigned to the virtual machine instance 103.

In an alternative embodiment, the scaling of the virtual machine instance can be performed upon receiving a request from the customer to increase or decrease the amount of resources allocated to the virtual machine instance. For example, the customer may invoke an API provided by the service provider and request the service provider to allocate additional CPU capacity to the virtual machine instance. In response to receiving the request, the scaling service 114 can allocate additional CPU capacity to the virtual machine.

In accordance with various embodiments, the system can also scale the virtual machine instances (103, 104) by allocating or de-allocating memory 116, and/or other hardware resources (e.g., NICs, GPU capacity, etc.). For example, if the virtual machine instance 103 is approaching 90% of memory capacity, the system may allocate additional memory (e.g., physical memory, virtual memory) to the virtual machine instance 103.

In accordance with one embodiment, the scaling of virtual machine instance can include changing it from one virtual machine instance type to another instance type, where each instance type is associated with a predefined set of resources. For example, upon exceeding a predefined threshold, the service may change the virtual machine assigned to the customer from a "small" instance type (e.g., a 1.7 GB RAM and 160 GB of storage) to a "medium" instance type (e.g., 3.75 GB RAM and 410 GB storage). In an alternative embodiment, the scaling of the virtual machine instance can be performed on a smooth continuum, e.g. by adding any arbitrary amount of CPU, memory or other resource capacity in any arbitrary increments, for example as required by the user application or service executing in the virtual machine and in accordance with defined metrics and thresholds.

Figure 2:
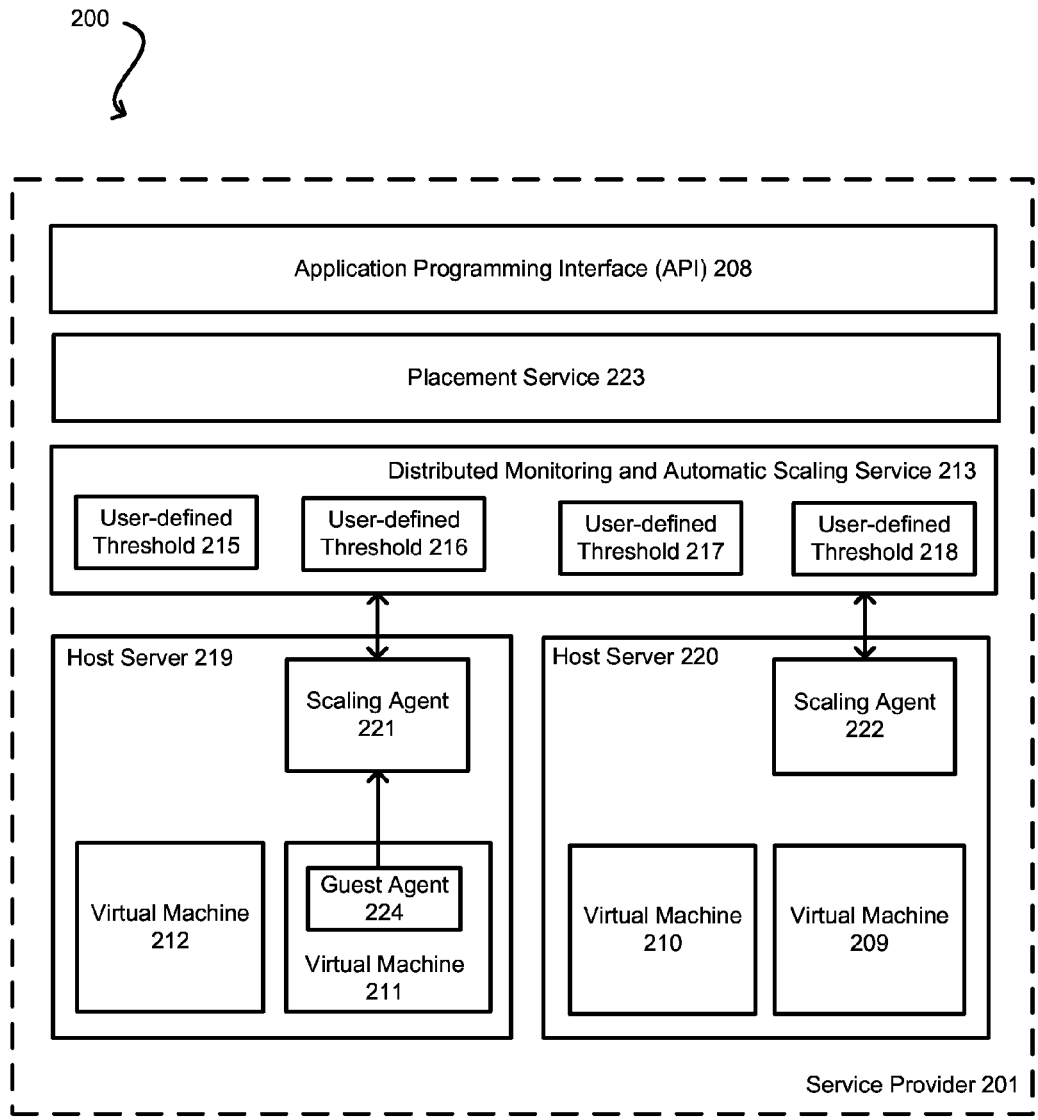
FIG. 2 illustrates an example of an automatic scaling service deployed by a service provider, in accordance with various embodiments.

FIG. 2 illustrates an example 200 of an automatic scaling service deployed by a service provider, in accordance with various embodiments. In the illustrated embodiment, a service provider 201 owns and operates a set of computing resources, such as host servers (219, 220) which the service provider offers for lease to its customers. In accordance with at least one embodiment, the service provider 201 creates a shared resource execution environment in which each user (e.g., customer) is associated with one or more virtual machine instances (209, 210, 211, 212). The virtual machine instances operate on the computing resources 214 and are accessible by the users on various devices over a network (e.g., Internet). As used throughout this disclosure, a network can be any wired or wireless network of devices that are capable of communicating with each other, including but not limited to the Internet or other Wide Area Networks (WANs), cellular networks, Local Area Networks (LANs), Storage Area Networks (SANs), Intranets, Extranets, and the like. The computing resources such as host servers (219, 220) of the service provider can be located in any physical or logical grouping of resources, such as a data center, a server farm, content delivery network (CDN) point-of-presence (POP) and the like.

In accordance with an embodiment, the service provider exposes one or more application programming interfaces (APIs) 208 for enabling users (e.g., customers) to access and manage the virtual machine instances (209, 210, 211, 212). For example, the APIs 208 can be employed by the users to submit a virtual machine image that will be used to provision the one or more virtual machine instances for the user. Similarly, in accordance with various embodiments described herein, the APIs 208 can be employed to specify one or more user-defined thresholds (215, 216, 217, 218) and metrics that the thresholds relate to. For example, one threshold may be associated with the operating capacity of the CPUs assigned to the virtual machine instance, as previously described. Another threshold may be associated with the amount of available memory assigned to the virtual machine. Another threshold may be an average number of requests being processed by the application executing on the virtual machine instance over a particular period of time. In addition, the API can be used by the customer to submit a request to allocate additional resource capacity to the virtual machine instance(s) or to de-allocate resource capacity from the virtual machine instance(s).

In accordance with an embodiment, once the user specifies the thresholds (215, 216, 217, 218), the automatic monitoring and scaling service 213 can monitor the runtime execution metrics to detect when the metrics have exceeded the defined threshold. In one embodiment, the automatic scaling service 213 is a centralized service that collects runtime information from each of the virtual machine instances (209, 210, 211, 212) and makes decisions to allocate or de-allocate resources from each VM instance. In an alternative embodiment, the automatic scaling service 213 can be implemented as a service running on each host machine and be responsible for scaling the virtual machine instances on the host machine.

In some embodiments, the host machines include a scaling agent (221, 222). The scaling agent may report various metrics to a centralized external scaling service 213, as well as receive commands from the central scaling service 213 and execute them. In accordance with an embodiment, some of the virtual machine instances may include a guest agent 224 that reports various metrics to the scaling agent (e.g., metrics indicate memory pressure, CPU pressure, etc. as perceived from within the virtual machine as well as user specified metrics), which may in turn report the metrics to the automatic scaling service 213. The scaling service 221 may then make determinations of scaling the virtual machine instance up or down in resource capacity.

In accordance with an embodiment, if the workload or demand for the user's service reaches a certain limit where a single virtual machine instance is no longer sufficient to adequately handle the work, the automatic scaling service 213 can begin provisioning new virtual machine instances for the user. In addition, the automatic scaling service 213 can continue to manage the scaling up and down of each individual virtual machine instance by adding and/or removing computing resources from each instance, as previously described. In some embodiments, thresholds may be defined which require multiple VM instances to support the workload even if all of the work could be handled by a single instance, for example to satisfy redundancy requirements. In this case, the service 213 may simultaneously adjust the resources allocated to more than one VM instance to satisfy user specified sizing policy.

In accordance with an embodiment, the automatic scaling of the virtual machine instances can enable a number of different billing models that can be used to charge the customer for utilizing the virtual machines. In one embodiment, the customer may be charged a premium for utilizing an automatically scalable virtual machine instance. For example, some customers may only need increased capacity during certain times of the day or on certain occasions. For those customers, it may be advantageous in terms of cost to utilize the automatic scaling service that can automatically add the needed capacity on-demand and reducing the capacity after the demand has subsided. Other customers may not readily know the demand for their service ahead of time and leveraging the automatic scaling service can provide an approach that ensures that their application will meet the demand without dedicating excess resource capacity to the application before requirements are well understood. In another embodiment, the customer may be billed per resource utilized for a given time period (e.g., per CPU hour utilized, per GB of memory per hour, etc.).

In accordance with an embodiment, the service provider 201 can further employ a placement service 223 that is responsible for provisioning the various virtual machine instances (209, 210, 211, 212) onto the host servers (219, 220). The placement service can determine whether the virtual machine instance will be a scalable virtual machine. If the placement service 223 determines that the virtual machine instance will be scalable, the service can provision the virtual machine onto a host server having excess capacity in order to be able to handle an increase in resource capacity that may be required at runtime or on-demand. For example, if the customer purchases an automatically scalable virtual machine for a premium, the placement service may place the VM onto the host machine that has enough capacity to accommodate increased workload of the VM. If the virtual machine will not be scalable, the placement service may provision the virtual machine onto host machines with little or no excess or reserved capacity.

In accordance with an embodiment, the service provider 201 can further provide an electronic marketplace that enables the customer to purchase (e.g., allocate) additional resources of the host computing device to their virtual machine. The price of the additional resources can be based at least in part on demand and supply of the one or more resources on the host computing device. For example, if there is a large amount of CPU capacity available on the host machine and demand is expected to remain low, the price for assigning additional CPUs to a virtual machine on that host machine may be low. Similarly, if there is a small amount of CPU capacity available, the price for additional CPUs may be higher. By allowing price fluctuation based on demand and supply in this manner, the service provider is able to optimize resource utilization and provide a more efficient distribution of workload across its network.

Figure 3A:
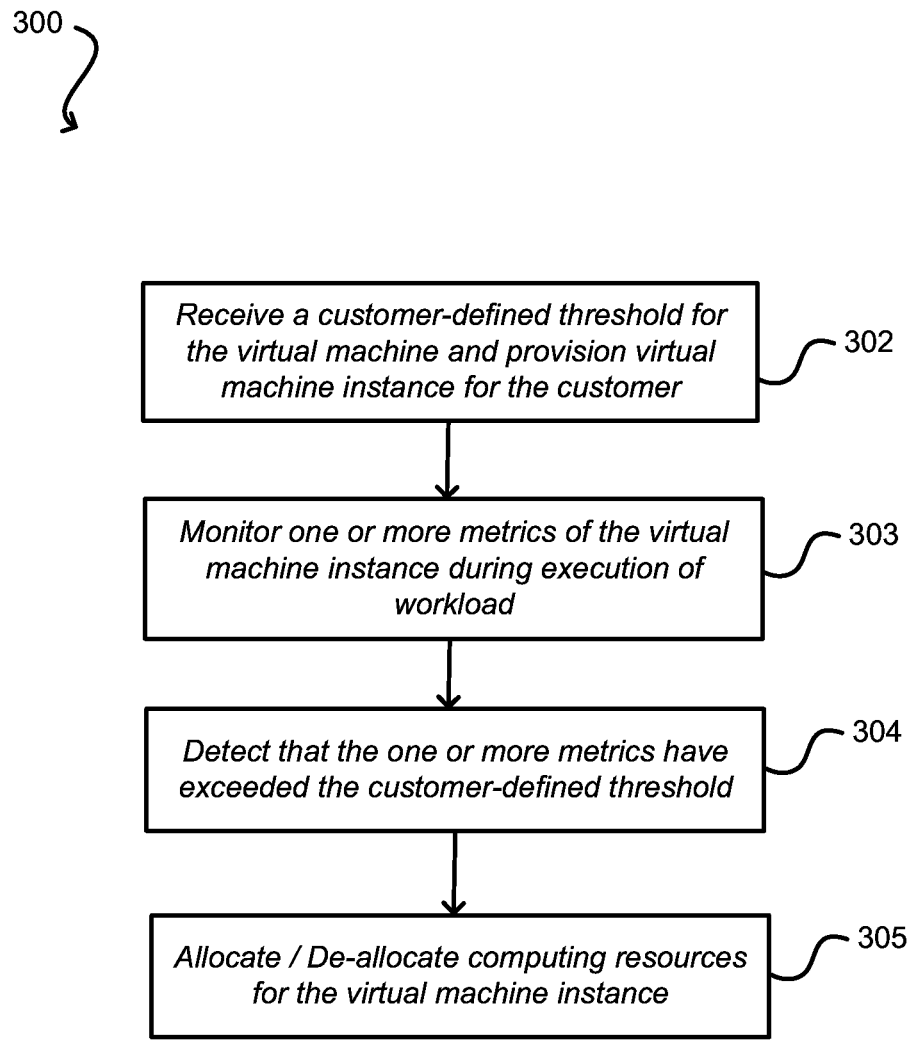
FIG. 3A illustrates an example process for automatically scaling a virtual machine instance on a host machine, in accordance with various embodiments.

FIG. 3A illustrates an example process 300 for automatically scaling a virtual machine instance on a host machine, in accordance with various embodiments. Although this figure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 302, a virtual machine instance is provisioned for a customer. The virtual machine instance can be provisioned by a service provider of a shared resource computing environment on behalf of the customer. In accordance with an embodiment, the virtual machine instance provisioned for the customer executes an application that provides a particular service. For example, a customer may deploy a service using several virtual machines, using one virtual machine instance as a database server, a separate virtual machine instance that functions as the front end (e.g. presentation logic) server and a third virtual machine instance that functions as a middleware computation server. When provisioning the virtual machine instance, the user may specify a customer-defined threshold for scaling the one or more virtual machines. In one embodiment, the customer can use an API provided by the service provider to specify the various values and thresholds for specific operating metrics. For example, the user may specify that the size of the virtual machine instance should be increased if the instance is running at 60% CPU capacity for longer than 1 minute. In another embodiment, the user may be able to provide sets of thresholds independent of a virtual machine instance and later associate these with the instance when it is started or otherwise, such as at a later time when it is already operating.

In operation 303, the automatic scaling service monitors one or more operating metrics of the virtual machine instance during the execution of the workload. For example, an agent process residing on the host machine may continuously gather various runtime information, such as CPU utilization, number of open connections, IP packet counts, number of requests and the like. The collected information can be reported to a central service that can make the decision to scale each virtual machine instance up or down according to the customer-specified instructions. In an alternative embodiment, the service can be hosted within the host machine and the gathered metrics do not need to be reported out. In other embodiments, the virtual machine instance may include an agent that reports user-specified metrics relevant to scaling the virtual machine.

In operation 304, the service detects that the one or more metrics have exceeded a customer-defined threshold. For example, the service may detect that the CPU usage of the virtual machine instance have exceeded a usage threshold for a minimum time frame specified by the customer.

In operation 305, the service can scale the virtual machine instance to increase or decrease capacity of various resources. In one embodiment, if the processing load has increased, the scaling service allocates additional computing resources to the virtual machine instance. For example, the scaling service may add more CPUs (or virtual units of CPU capacity) to the virtual machine instance. In another embodiment, the scaling service may de-allocate a portion of the resources from the virtual machine instance and/or move the portion of the resources to other virtual machine instances. In some embodiments, the portion or subset selected for de-allocation is determined in order to bring the metrics back to within the customer-defined thresholds.

Figure 3B:
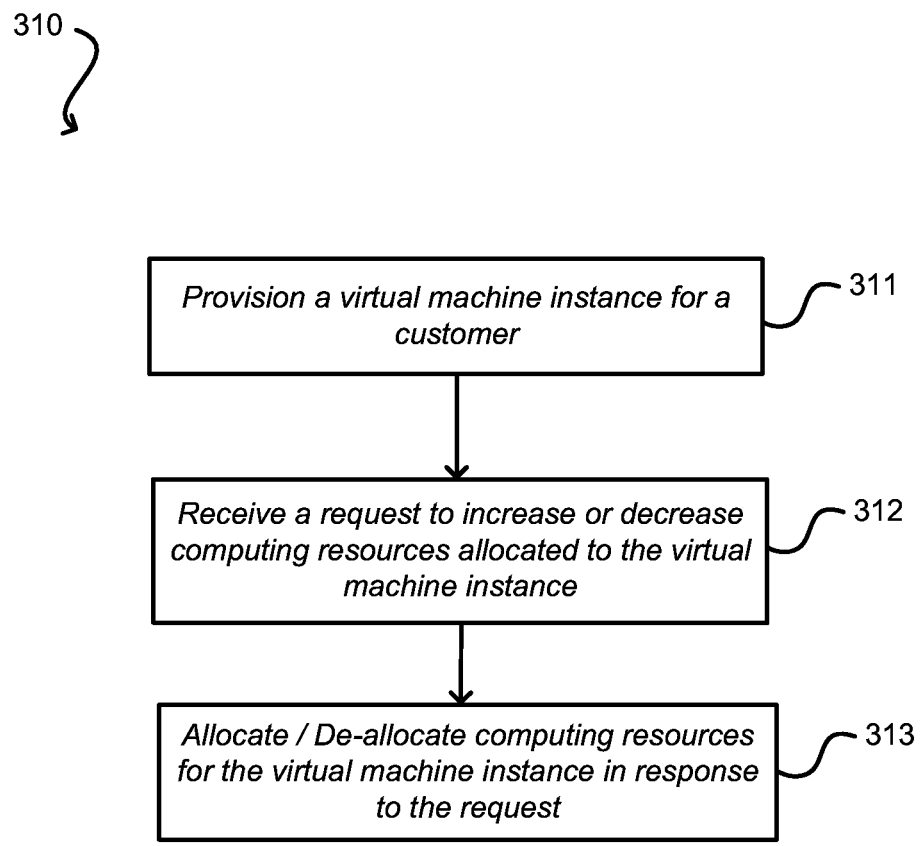
FIG. 3B illustrates an example process of scaling a virtual machine instance in response to receiving a request from the user, in accordance with various embodiments.

FIG. 3B illustrates an example process 310 of scaling a virtual machine instance in response to receiving a request from the user, in accordance with various embodiments. In operation 311, the virtual machine instance is provisioned on a host machine for a user, as previously described. Once provisioned, the virtual machine instance can execute a workload on behalf of the user. In operation 312, the service provider receives a request to increase or decrease the computing resource capacity allocated to the virtual machine instance. For example, the user may determine that the virtual machine instance needs more CPU capacity due to an increase in workload. The user may then invoke an API to allocate additional CPUs to the virtual machine instance. In operation 313, the scaling service allocates the additional computing resources to the virtual machine instance or deallocates computing resources from the virtual machine in response to the request.

Figure 4:
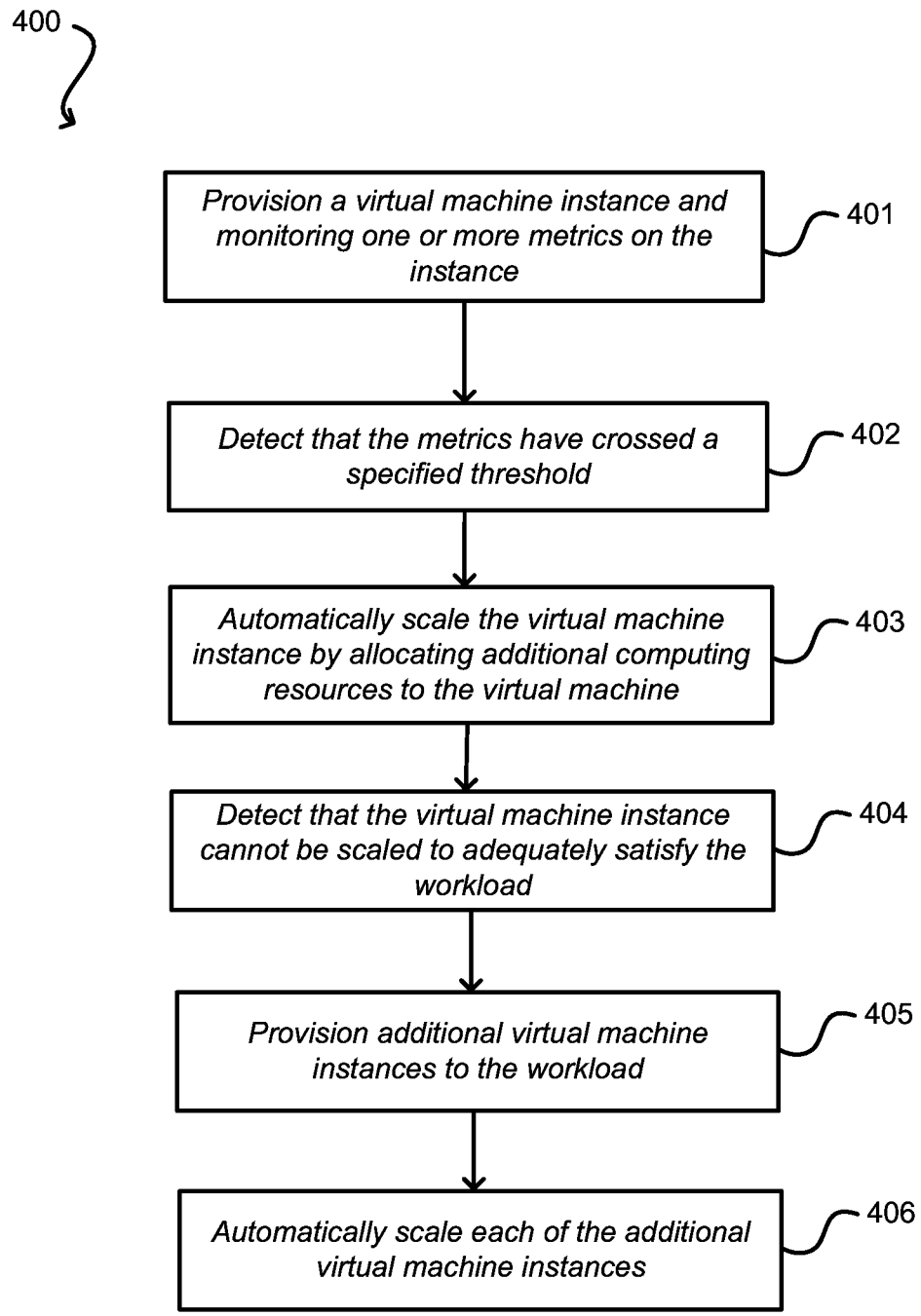
FIG. 4 illustrates an example process for automatically scaling a virtual machine instance and allocating additional virtual machine instances, in accordance with various embodiments.

FIG. 4 illustrates an example process 400 for automatically scaling a virtual machine instance and allocating additional virtual machine instances, in accordance with various embodiments.

In operation 401, a virtual machine instance is provisioned for a user, as previously described. The virtual machine instance is then monitored for one or more pre-specified operating metrics. In operation 402, the service may detect that the one or more operating metrics for the virtual machine instance have crossed (exceeded or fallen below) a customer-defined threshold. In operation 403, the scaling service automatically scales the virtual machine instance by allocating additional computing resources to the virtual machine instance. For example, the scaling service may add additional memory capacity or CPU capacity to the virtual machine instance.

In operation 404, the scaling service may determine that the virtual machine instance cannot be scaled to adequately satisfy the workload required of the service. For example, it may determine that the virtual machine instance has grown to a maximum size allowed by the service provider. In operation 405, the scaling service may begin to automatically provision one or more additional virtual machine instances to handle the workload. Each of the additional virtual machine instances can also be scaled in the manner previously described (operation 405).

Figure 5:
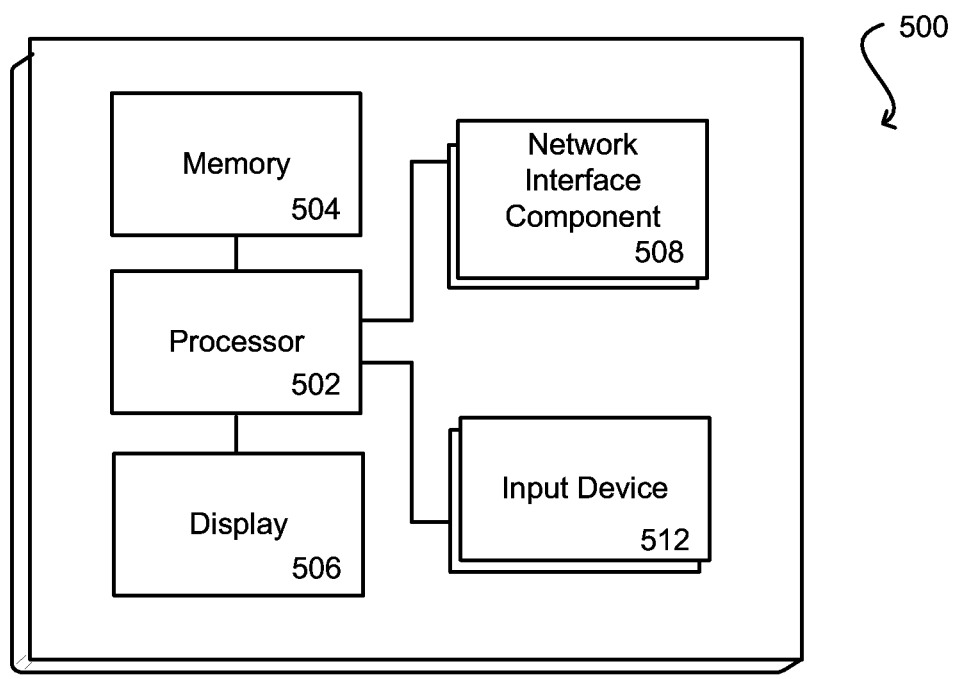
FIG. 5 illustrates a logical arrangement of a set of general components of an example computing device that can be utilized in accordance with various embodiments.

FIG. 5 illustrates a logical arrangement of a set of general components of an example computing device 500. In this example, the device includes a processor 502 for executing instructions that can be stored in a memory device or element 504. As would be apparent to one of ordinary skill in the art, the device can include many types of memory, data storage, or non-transitory computer-readable storage media, such as a first data storage for program instructions for execution by the processor 502, a separate storage for images or data, a removable memory for sharing information with other devices, etc. The device typically will include some type of display element 506, such as a touch screen or liquid crystal display (LCD), although devices such as portable media players might convey information via other means, such as through audio speakers. As discussed, the device in many embodiments will include at least one input element 508 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 500 of FIG. 5 can include one or more network interface elements 508 for communicating over various networks, such as a Wi-Fi, Bluetooth, RF, wired, or wireless communication systems. The device in many embodiments can communicate with a network, such as the Internet, and may be able to communicate with other such devices.

Figure 6:
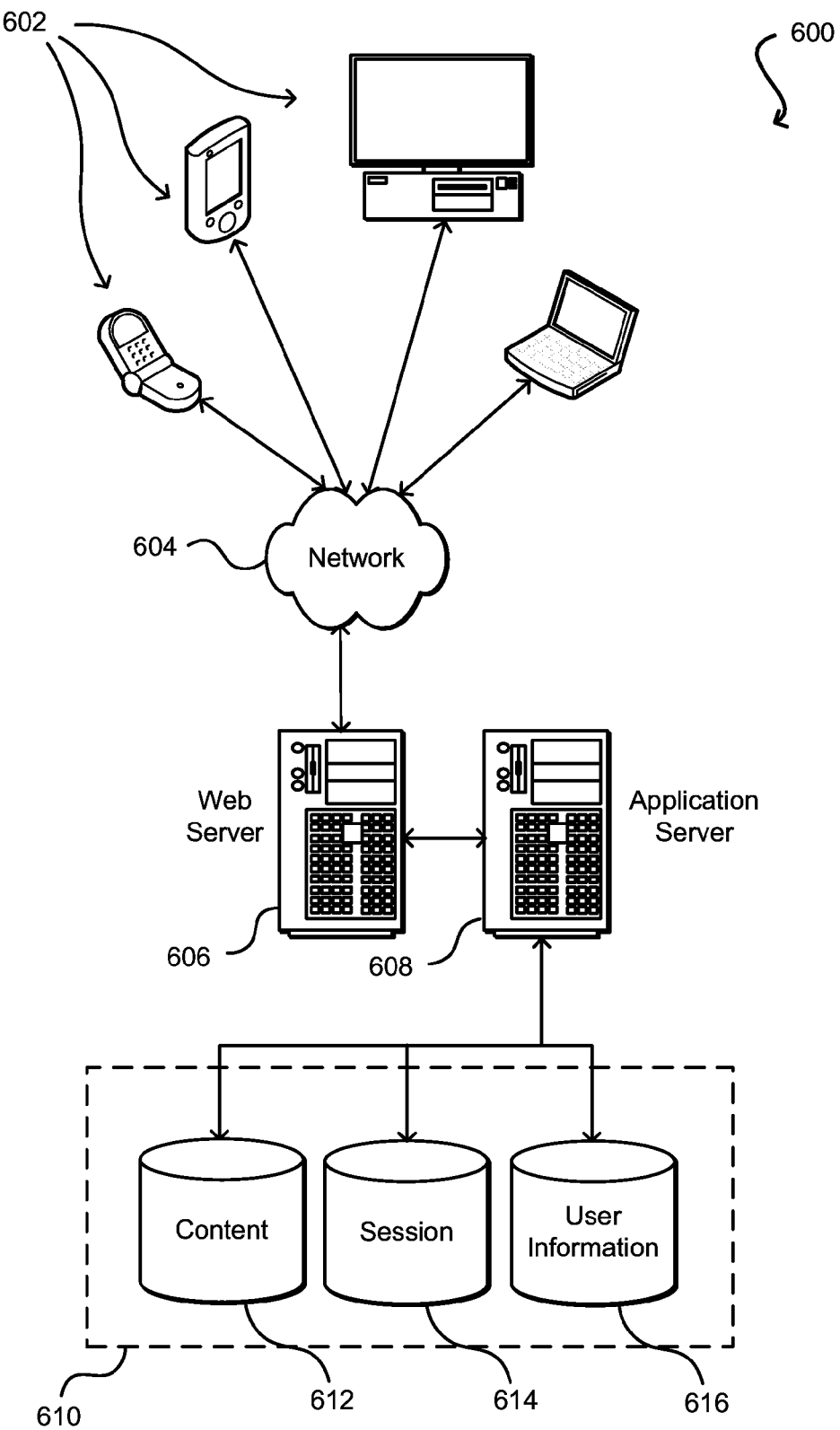
FIG. 6 illustrates an example of an environment for implementing aspects in accordance with various embodiments.

As discussed, different approaches can be implemented in various environments in accordance with the described embodiments. For example, FIG. 6 illustrates an example of an environment 600 for implementing aspects in accordance with various embodiments. As will be appreciated, although a Web-based environment is used for purposes of explanation, different environments may be used, as appropriate, to implement various embodiments. The system includes an electronic client device 602, which can include any appropriate device operable to send and receive requests, messages or information over an appropriate network 604 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 606 for receiving requests and serving content in response thereto, although for other networks an alternative device serving a similar purpose could be used, as would be apparent to one of ordinary skill in the art.

The illustrative environment includes at least one application server 608 and a data store 610. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 602 and the application server 708, can be handled by the Web server 606. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing production data 612 and user information 616, which can be used to serve content for the production side. The data store also is shown to include a mechanism for storing log or session data 614. It should be understood that there can be many other aspects that may need to be stored in the data store, such as page image information and access rights information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 602. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method for scaling a virtual machine, said method comprising:

associating, by one or more computer systems, an account with a customer;

providing, by the one or more computer systems, an application programming interface (API) to customers;

receiving, by the one or more computer systems, from at least one customer via the application programming interface (API), a request to launch an instance of a virtual machine image;

launching, by the one or more computer systems, the virtual machine image;

provisioning, by the one or more computer systems, a virtual machine instance for the at least one customer based on the launched virtual machine image, wherein the virtual machine instance is provisioned on a host computing device;

receiving, at the one or more computer systems, from the customer via the API, a customer-defined threshold associated with the virtual machine instance, wherein the customer-defined threshold is specified at the time of the provisioning of the virtual machine instance;

associating, by the one or more computer systems, one or more metrics with the virtual machine instance;

monitoring, by the one or more computer systems, the one or more metrics associated with the virtual machine instance during execution of the virtual machine instance; and adjusting, by the one or more computer systems, allocation of one or more computing resources to the virtual machine instance based at least in part on the one or more metrics and the received customer-defined threshold.

2. The method of claim 1, wherein the method further comprises:

determining, by the one or more computer systems, that additional computing resources cannot be allocated to the virtual machine instance; and provisioning, by the one or more computer systems, a second virtual machine instance for the customer based on a determining that the additional computing resources cannot be allocated to the virtual machine instance.

3. The method of claim 1, further comprising:

causing, at the one or more computer systems, an account associated with the customer to be charged a fee for running the virtual machine instance, wherein the fee is based at least in part on the adjusted computing resources allocated to the virtual machine instance.

* * * * *